J. D. O'NEILL.
TRACK SCALE.
APPLICATION FILED JULY 3, 1915.

1,314,423.  Patented Aug. 26, 1919.

Witnesses

Inventor
J. D. O'Neill
By Fetherstonhaugh Co
Attorneys

UNITED STATES PATENT OFFICE.

JAMES D. O'NEILL, OF MONTREAL, QUEBEC, CANADA.

TRACK-SCALE.

1,314,423.

Specification of Letters Patent.   Patented Aug. 26, 1919.

Application filed July 3, 1915.   Serial No. 38,024.

*To all whom it may concern:*

Be it known that I, JAMES D. O'NEILL, a subject of the King of Great Britain, and resident of the city of Montreal, in the Province of Quebec and Dominion of Canada, have invented certain new and useful Improvements in Track-Scales, of which the following is a full, clear, and exact description.

This invention relates to improvements in weighing scales, and particularly to large platform scales of the type used for weighing railway cars and the like.

The object of the invention is to provide a simple, durable and efficient means for transmitting the movement of the platform levers to the fifth lever leading to the scale beam.

A further object is to provide a connection between the platform levers and fifth lever of such nature that the pull will be exerted centrally on the fifth lever.

In the large platform scales at present in general use for weighing railway cars, and similar heavy objects, there is a system of levers under the platform, comprising main levers and primary and secondary extension levers, which latter meet and transmit their movement to what is termed a fifth lever connected to the scale beam. In track scales, particularly, where the platform is long and narrow, these extension levers are arranged in line with one another and meet at the center of the platform where they are connected to the fifth lever, which extends at any angle, projecting under the scale house at the side of the platform. Owing to the length of the platform, it has been found that unless a car is placed exactly centrally on the platform or raft, as it is commonly termed, the levers at one end exert a greater pull on the fifth lever than the levers at the other end. The result is a noticeable torsion in the fifth lever, which of course seriously affects the accuracy of the scale. This source of trouble has been the subject of considerable investigation in the past, and scale manufacturers have resorted to various means to overcome this torsion. In the latest type of track scales produced by a large manufacturer, the ends of the secondary extension levers just barely clear each other, and the link connection to the fifth lever is placed as close as possible to the ends of the secondary levers, the links being connected to the fifth lever by a device termed a loop, shaped similarly to a heart-shackle. With this is combined an extremely heavy fifth lever with extended bearings. The fact nevertheless remains that the pull of the secondary levers lies out of the vertical plane of the fifth lever, so that a torsion stress still exists in this lever, which is bound to affect the accuracy of the scale.

The device forming the subject of this invention provides a connection between the secondary extension and fifth levers in which the pull of the secondary levers is exerted centrally on the fifth lever, so that there is no torsion in the fifth lever. This is effected by overlapping the ends of the secondary levers so as to bring the bearing points in line with one another directly above the central longitudinal axis of the fifth lever. To obviate any torsion in the secondary levers themselves, the end of one lever is bifurcated for the entrance of the other lever, so that the stresses are centralized.

In the drawings which illustrate the invention:—

Figure 1:
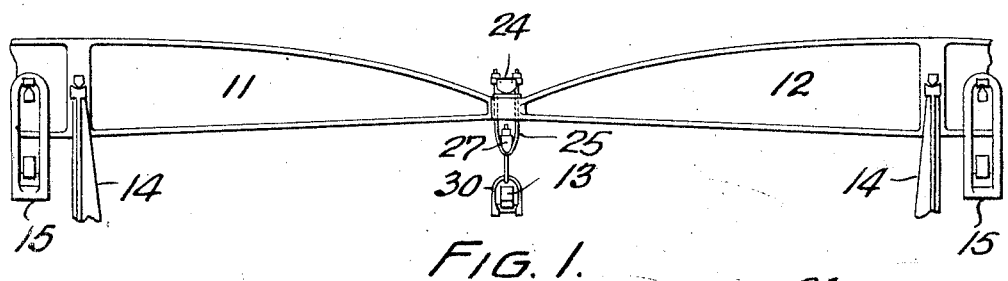
Figure 1 is a fragmentary side elevation of a track scale arranged according to this invention.
Figure 2:
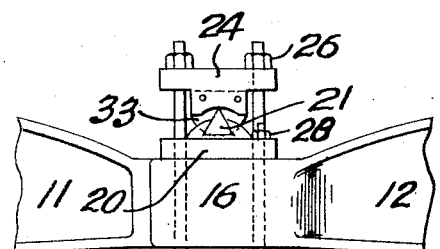
Fig. 2 is an enlarged side elevation at the junction of the secondary and fifth levers.
Figure 3:
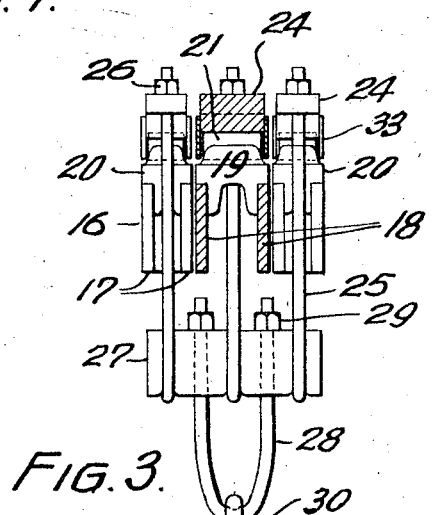
Fig. 3 is an end elevation corresponding to Fig. 2 showing one of the levers in section.
Figure 4:
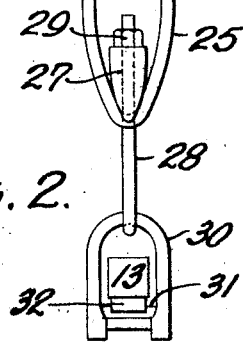
Fig. 4 is a plan view showing various parts removed.
Figure 4:
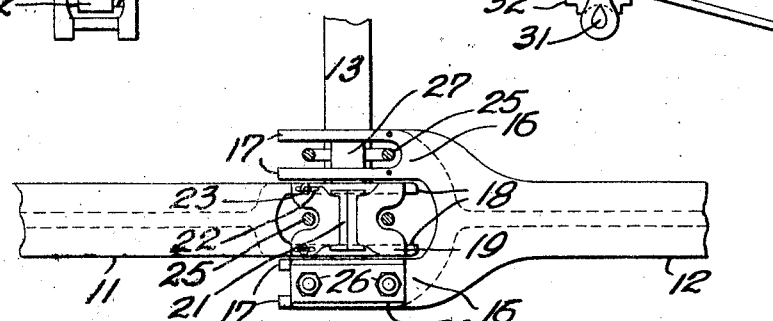

Referring more particularly to the drawings, 11 and 12 designate the secondary extension levers and 13 the fifth or transverse lever. The levers 11 and 12 are supported on columns 14 and receive at the remote ends (not shown), the movement of the primary or end extension levers, and intermediate their ends, the partial load of the platform through the connections 15 from certain of the main levers in the well known manner. The end of the lever 12 is bifurcated, as clearly shown in Figs. 3 and 4, for the reception of the lever 11, each arm 16 of the bifurcation being formed into two jaws 17 similar to the jaws 18 of the lever 11. The lever 11 is of the usual form and dimensions, while each bifurcation 16 of the lever 12 is somewhat lighter, so that the strength of the two bifurcations is equal to the strength of the lever jaws 18. Nose irons 19 and 20 are mounted on and between the jaws of the levers 11 and 12 in the well known manner, and each carry a knife edge pivot 21, all three pivots being arranged axially in line. These nose irons are slotted at 22 and connected to the jaws of the levers by studs and nuts 23, or by any other suitable means. A saddle 24 having a concave bearing surface rests on each pivot and is provided with a U-bolt or link 25, which passes down between the jaws of the levers through suitable recesses formed in the ends of the nose irons, as clearly shown in Fig. 4. These U-bolts are connected to the saddles 24 at their upper ends by means of nuts 26 or any other suitable means, so that all three may be adjusted to uniformly support an evener 27 extending transversely of the levers 11 and 12. A U-bolt 28 is connected to the evener between the links 25 by means of nuts 29 or other suitable means. This U-bolt 28 with the evener is arranged centrally below the pivots 21 and supports a shackle or loop 30 carrying the knife edge pivot 31, with which the bearing 32 of the fifth lever 13 engages. Each saddle is provided on its sides with small plates 33 connected thereto by screws or other suitable means, and lying outside the ends of the pivots 21. The purpose of these plates is to prevent the saddles slipping off the pivots.

It will be clearly seen from the drawings that the pull of either or both of the levers 11 and 12 is transmitted to the fifth lever 13 in such a way that it is exerted centrally on the lever and exerts no torsion whatever in this lever. It will thus be seen that no matter how the platform is loaded, the weight will exert only a central pull on the fifth lever, so that none of the pull will be lost in a torsion stress. It is easily possible to construct the fifth lever so that there will be absolutely no flexion therein, but it is practically impossible, as any one versed in the art will readily understand, to construct a lever of practical size and weight which will be proof against torsion stresses. The device is extremely simple and durable, and will enable absolutely accurate weighing to be performed under all conditions of loading.

While this invention has been described and illustrated particularly with reference to one type of track scales, it is obvious that the improvement is not limited to this particular type or kind of scale, but may be applied to a large variety of types, and therefore it is by no means essential to the invention that the fifth lever be below the secondary levers or at right angles thereto. Nor is the invention limited to the particular shape of levers or details of construction.

Having thus described my invention, what I claim is:

1. In a device of the character described, the combination with a fifth lever of a pair of secondary levers overlapping side by side at their ends, independently operable connecting means between the secondary levers and the fifth lever, and pivots disposed on the overlapping ends of said secondary levers in the central plane of the fifth lever for supporting said connecting means.

2. In a device of the character described, the combination with a fifth lever of a pair of secondary levers disposed transversely thereof, a link connection including an evener between said secondary levers and the fifth lever arranged to transmit the pull of each of said secondary levers to the fifth lever uniformly on each side of the longitudinal axis thereof.

3. In a device of the character described, the combination with a fifth lever of a pair of secondary levers overlapping at their ends, pivots mounted in line with one another on said secondary levers and in the plane of oscillation of the fifth lever, and a connection between said pivots and the fifth lever arranged to distribute the pull of each secondary lever uniformly on each side of the longitudinal axis of the fifth lever comprising an evener, links connecting said secondary levers therewith and a link connecting said evener with said fifth lever.

4. In a device of the character described, the combination with a fifth lever of a pair of secondary levers, one of which is bifurcated at its end for the reception of the other lever, pivots mounted on the ends of said secondary levers in line with one another and in the plane of oscillation of the fifth lever passing through the longitudinal axis thereof, and independently operable connections between said pivots and the fifth lever arranged to transmit the pull of any of the secondary levers centrally on the fifth lever independently of the other secondary levers.

5. In a device of the character described, the combination with a fifth lever of a pair of secondary levers overlapping at their ends, pivots mounted on said levers in line with one another and in the plane of oscillation of the fifth lever containing the longitudinal axis thereof, saddles resting on the pivots, and a connection between said saddles and the fifth lever connecting the secondary levers with one another.

6. In a device of the character described, the combination with a fifth lever of a secondary lever bifurcated at its end and a further secondary lever having its end positioned between the bifurcations of the other, knife edge pivots mounted on the intermeshing portions of said levers in line with one another and in the plane of oscillation of the fifth lever, a saddle resting on each pivot, an evener on the opposite side of the levers from said saddles, links connecting the saddles and evener, a U-bolt connected to the evener intermediate the links, a loop passing through said U-bolt and embracing the end of the fifth lever, and a pivot in said loop for a bearing of the fifth lever.

7. In a scale, a fifth lever, a pair of levers having adjacent end pivots arranged in line transversely thereof and in the plane of the longitudinal axis of the fifth lever, and independent connections between said levers and the fifth lever each arranged to transmit force to the fifth lever in the plane of the longitudinal axis.

8. In a scale, a fifth lever, a pair of levers having extension lever pivots arranged in line with one another and in the plane of the central axis of the fifth lever, and independent connections between said levers and the fifth lever supported by said pivots and each arranged to transmit force to the fifth lever equally on each side of its longitudinal axis.

9. In a scale, a pair of levers arranged in line, there being bifurcations on one of said levers embracing the end of the other lever, and pivots disposed on said lever ends in the plane of the central axis of the fifth lever, and independent connection between said levers and the fifth lever supported by said pivots and each arranged to transmit force to the fifth lever equally on each side of its longitudinal axis.

10. In a track scale, the combination with levers arranged in a common plane and having transversely-extending pivots symmetrically arranged with respect to said plane and in substantial alinement with each other, a fifth lever in the plane of said pivots, and a connector between said levers and fifth lever, comprising an independent bearing for each of said pivots, links connected to said bearings, and an evener connection between said links.

11. In a track scale, the combination with oppositely-extending and alined levers, of transverse pivots therefor in substantial alinement with each other, a fifth lever provided with a pivot, and means connecting said transverse pivots to said fifth lever pivot, including an evener connection.

In witness whereof I have hereunto set my hand in the presence of two witnesses.

JAMES D. O'NEILL.

Witnesses:
M. G. STENHOUSE,
G. M. MORELAND.